US012608556B2

(12) United States Patent
Qiu

(10) Patent No.: US 12,608,556 B2
(45) Date of Patent: Apr. 21, 2026

(54) INTENTION RECOGNITION METHOD, ELECTRONIC DEVICE, AND STORAGE MEDIUM

(71) Applicant: BEIJING BAIDU NETCOM SCIENCE TECHNOLOGY CO., LTD., Beijing (CN)

(72) Inventor: Qi Qiu, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 199 days.

(21) Appl. No.: 18/747,081

(22) Filed: Jun. 18, 2024

(65) Prior Publication Data

US 2025/0005290 A1     Jan. 2, 2025

(30) Foreign Application Priority Data

Dec. 11, 2023     (CN) .......................... 202311696384.0

(51) Int. Cl.
    *G06F 40/35*     (2020.01)

(52) U.S. Cl.
    CPC ................................... *G06F 40/35* (2020.01)

(58) Field of Classification Search
    CPC ...... G06F 40/35; G06F 40/30; G06F 16/3329; G06N 5/04
    See application file for complete search history.

(56) References Cited

U.S. PATENT DOCUMENTS

| | | | |
|---|---|---|---|
| 11,379,473 B1 | 7/2022 | Paiz | |
| 2016/0162464 A1 | 6/2016 | Munro et al. | |
| 2019/0065506 A1 | 2/2019 | Li et al. | |
| 2019/0088250 A1* | 3/2019 | Kim ...................... G10L 15/063 |
| 2021/0350209 A1* | 11/2021 | Wang ........................ G06N 5/04 |
| 2024/0379096 A1* | 11/2024 | Bose ....................... G10L 15/10 |
| 2025/0124915 A1* | 4/2025 | Chun .................... G10L 15/065 |

FOREIGN PATENT DOCUMENTS

| | | |
|---|---|---|
| CN | 101004737 A | 7/2007 |
| CN | 101432767 A | 5/2009 |
| CN | 102043802 A | 5/2011 |
| CN | 111581336 A | 8/2020 |

(Continued)

OTHER PUBLICATIONS

Office Action issued in Chinese application No. 2023116659380 mailed on Mar. 11, 2025 (18 pages).

(Continued)

*Primary Examiner* — Athar N Pasha
(74) *Attorney, Agent, or Firm* — Osha Bergman Watanabe & Burton LLP

(57) ABSTRACT

An intention recognition method includes: obtaining an input sentence; obtaining at least one first sentence-intention pair based on the input sentence, in which the first sentence-intention pair includes a candidate sentence similar to the input sentence and a candidate intention to which the candidate sentence belongs; generating first prompt information based on the at least one first sentence-intention pair; and obtaining a target intention to which the input sentence belongs by performing an intention recognition on the input sentence based on the first prompt information.

18 Claims, 6 Drawing Sheets

(56) References Cited

FOREIGN PATENT DOCUMENTS

| CN | 112182350 A | 1/2021 |
|----|-------------|--------|
| CN | 115269504 A | 11/2022 |
| CN | 115413346 A | 11/2022 |
| CN | 116112190 A | 5/2023 |
| CN | 116226350 A | 6/2023 |
| CN | 116541493 A | 8/2023 |
| CN | 116595122 A | 8/2023 |
| CN | 116798417 A | 9/2023 |
| CN | 116915917 A | 10/2023 |
| CN | 116932701 A | 10/2023 |
| CN | 116991974 A | 11/2023 |
| CN | 117033598 A | 11/2023 |
| CN | 117034958 A | 11/2023 |
| CN | 117076649 A | 11/2023 |
| CN | 117093698 A | 11/2023 |

OTHER PUBLICATIONS

Office Action issued in Chinese application No. 202311696790.7 mailed on Mar. 1, 2025 (15 pages).

Office Action issued in Chinese application No. 202311696384.0 mailed on Mar. 11, 2025 (38 pages).

Office Action issued in Chinese application No. 2023116659380 mailed on May 16, 2025 (11 pages).

Rajendra Kumar Roul, "An effective approach for semantic-based clustering and topic-based ranking of web documents" International Journal of Data Science and Analytics, Mar. 15, 2018 (16 pages).

Xin, et al. "Development trend of information retrieval research in the era of big language model" China Renmin university gaoling artificial intelligence college, May 19, 2025 (10 pages).

"Knowledge Map-Building Intelligent Question Answering System Based on ES(ElasticSearch) and gAnswer" ES (ElasticSearch) https://zhuanlan.zhihu.com/p/91294301, Mar. 7, 2025 (16 pages).

* cited by examiner

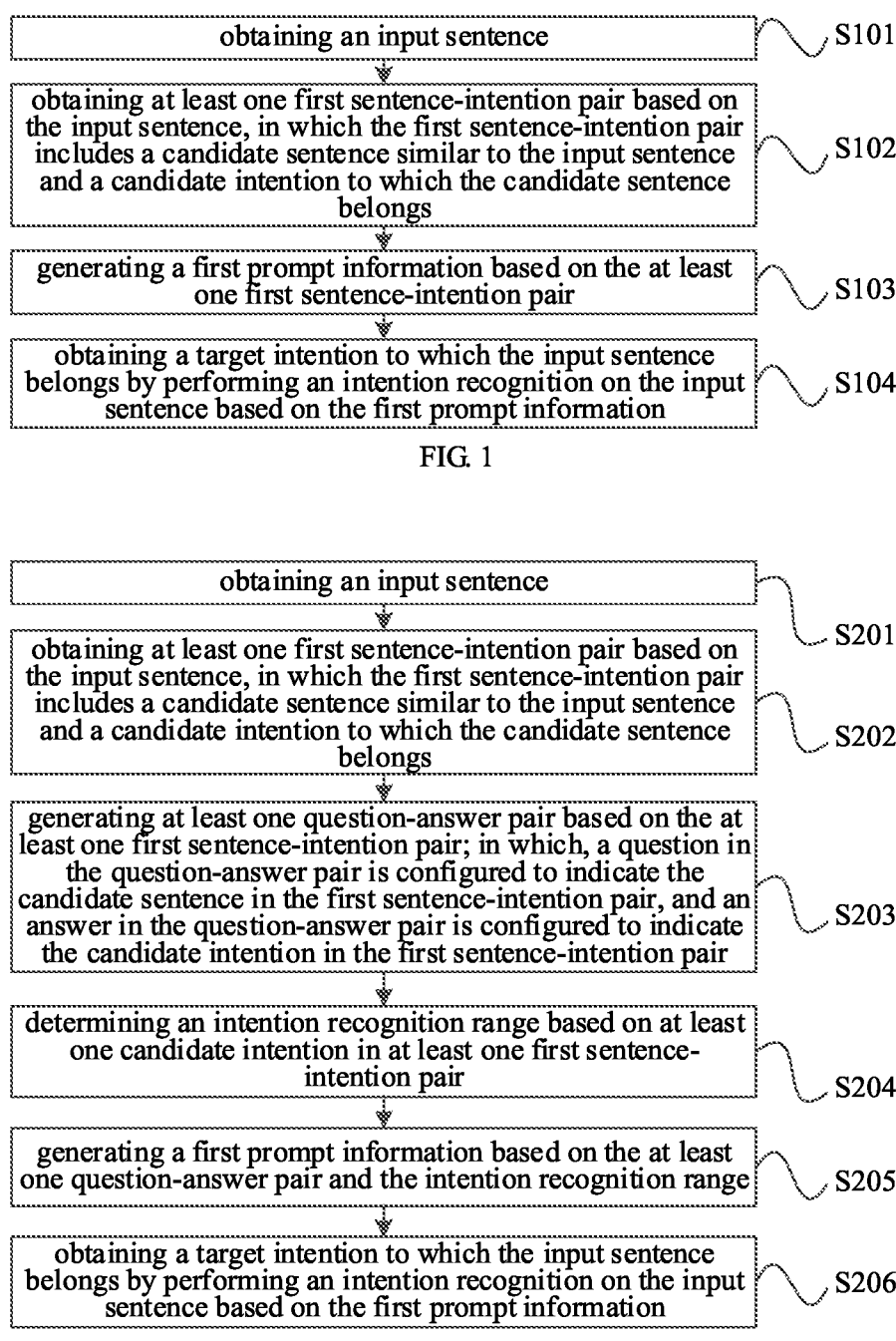

obtaining an input sentence — S101 obtaining at least one first sentence-intention pair based on the input sentence, in which the first sentence-intention pair includes a candidate sentence similar to the input sentence and a candidate intention to which the candidate sentence belongs — S102 generating a first prompt information based on the at least one first sentence-intention pair — S103 obtaining a target intention to which the input sentence belongs by performing an intention recognition on the input sentence based on the first prompt information — S104

FIG. 1 obtaining an input sentence obtaining at least one first sentence-intention pair based on the input sentence, in which the first sentence-intention pair includes a candidate sentence similar to the input sentence and a candidate intention to which the candidate sentence belongs — S201, S202 generating at least one question-answer pair based on the at least one first sentence-intention pair; in which, a question in the question-answer pair is configured to indicate the candidate sentence in the first sentence-intention pair, and an answer in the question-answer pair is configured to indicate the candidate intention in the first sentence-intention pair — S203 determining an intention recognition range based on at least one candidate intention in at least one first sentence-intention pair — S204 generating a first prompt information based on the at least one question-answer pair and the intention recognition range — S205 obtaining a target intention to which the input sentence belongs by performing an intention recognition on the input sentence based on the first prompt information — S206

FIG. 2

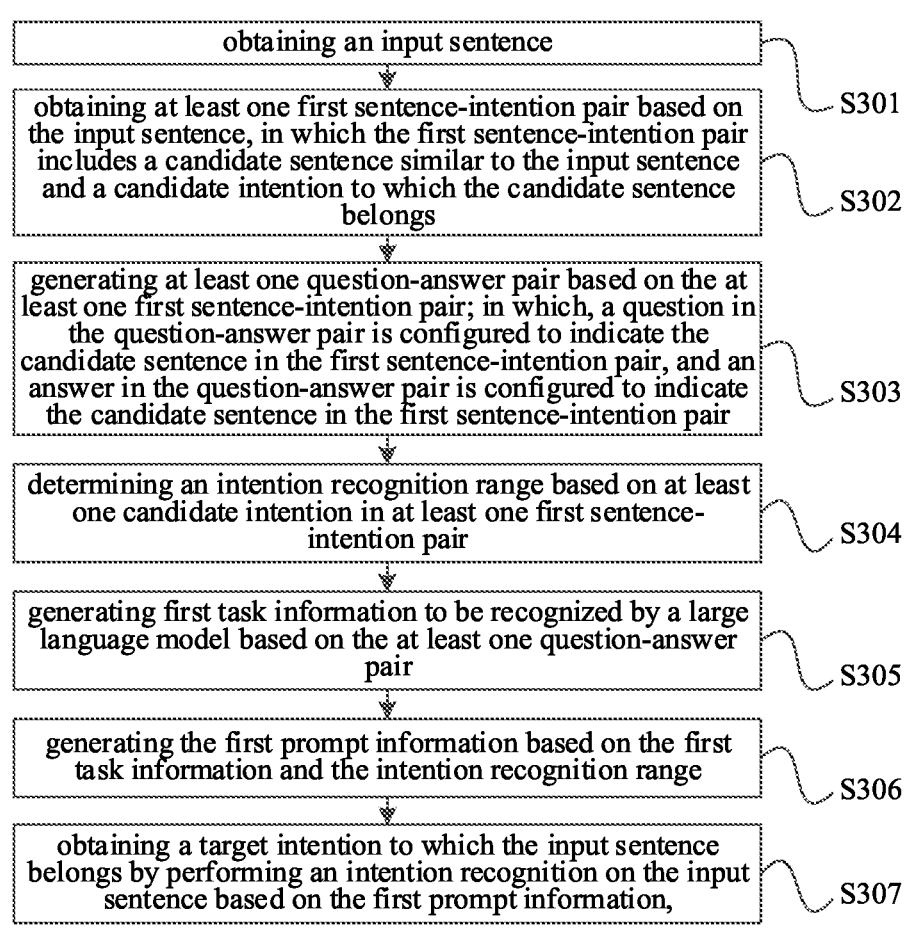

obtaining an input sentence
— S301 obtaining at least one first sentence-intention pair based on the input sentence, in which the first sentence-intention pair includes a candidate sentence similar to the input sentence and a candidate intention to which the candidate sentence belongs
— S302 generating at least one question-answer pair based on the at least one first sentence-intention pair; in which, a question in the question-answer pair is configured to indicate the candidate sentence in the first sentence-intention pair, and an answer in the question-answer pair is configured to indicate the candidate sentence in the first sentence-intention pair
— S303 determining an intention recognition range based on at least one candidate intention in at least one first sentence-intention pair
— S304 generating first task information to be recognized by a large language model based on the at least one question-answer pair
— S305 generating the first prompt information based on the first task information and the intention recognition range
— S306 obtaining a target intention to which the input sentence belongs by performing an intention recognition on the input sentence based on the first prompt information,
— S307

FIG. 3

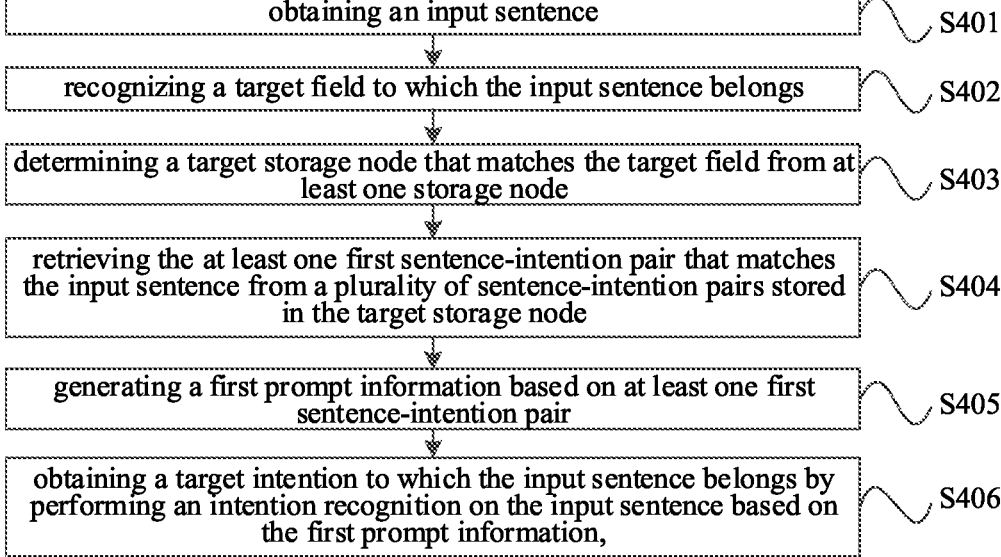

obtaining an input sentence
— S401 recognizing a target field to which the input sentence belongs
— S402 determining a target storage node that matches the target field from at least one storage node
— S403 retrieving the at least one first sentence-intention pair that matches the input sentence from a plurality of sentence-intention pairs stored in the target storage node
— S404 generating a first prompt information based on at least one first sentence-intention pair
— S405 obtaining a target intention to which the input sentence belongs by performing an intention recognition on the input sentence based on the first prompt information,
— S406

FIG. 4

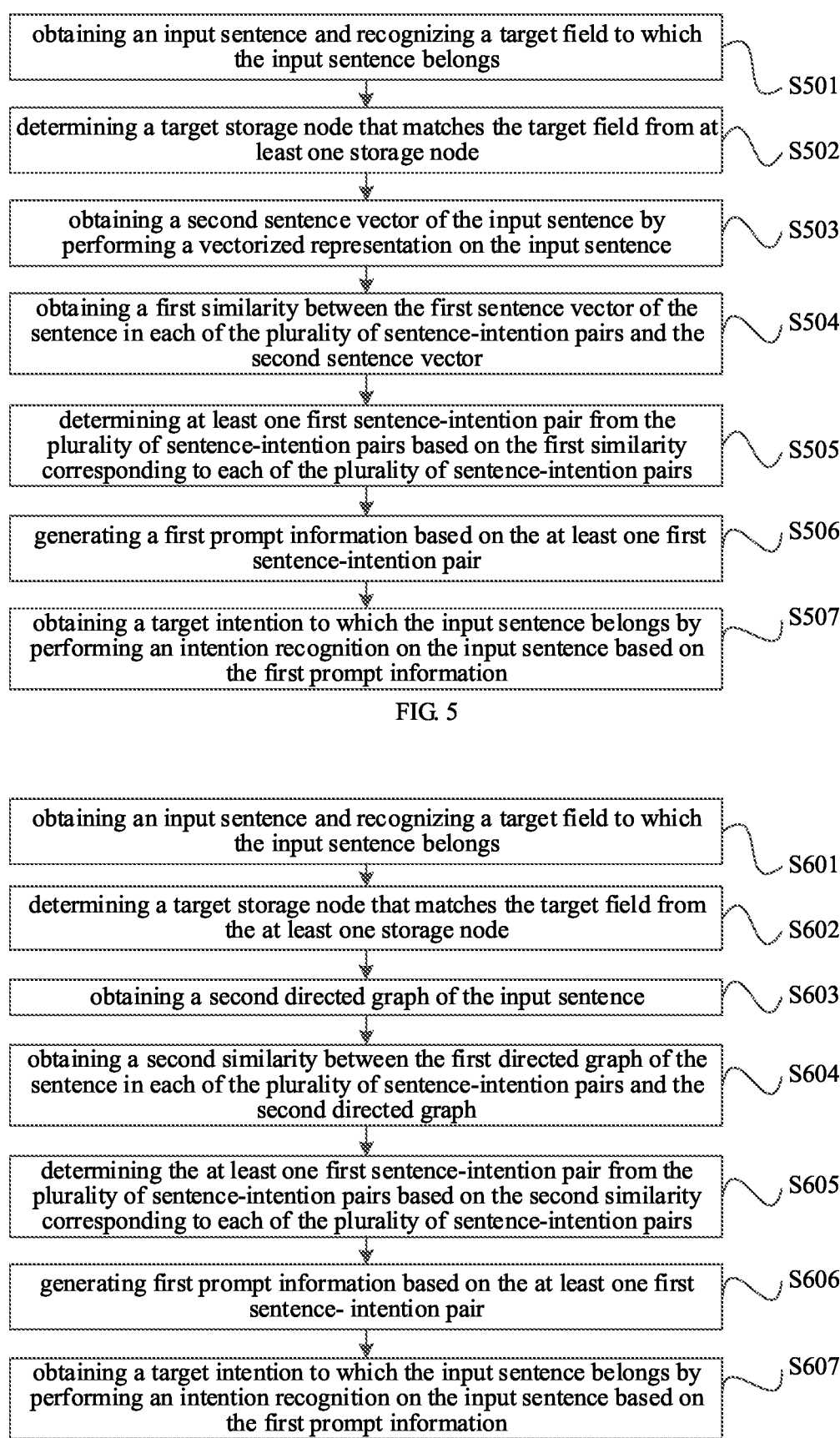

obtaining an input sentence and recognizing a target field to which the input sentence belongs ⟋ S501 determining a target storage node that matches the target field from at least one storage node ⟋ S502 obtaining a second sentence vector of the input sentence by performing a vectorized representation on the input sentence ⟋ S503 obtaining a first similarity between the first sentence vector of the sentence in each of the plurality of sentence-intention pairs and the second sentence vector ⟋ S504 determining at least one first sentence-intention pair from the plurality of sentence-intention pairs based on the first similarity corresponding to each of the plurality of sentence-intention pairs ⟋ S505 generating a first prompt information based on the at least one first sentence-intention pair ⟋ S506 obtaining a target intention to which the input sentence belongs by performing an intention recognition on the input sentence based on the first prompt information ⟋ S507

FIG. 5 obtaining an input sentence and recognizing a target field to which the input sentence belongs ⟋ S601 determining a target storage node that matches the target field from the at least one storage node ⟋ S602 obtaining a second directed graph of the input sentence ⟋ S603 obtaining a second similarity between the first directed graph of the sentence in each of the plurality of sentence-intention pairs and the second directed graph ⟋ S604 determining the at least one first sentence-intention pair from the plurality of sentence-intention pairs based on the second similarity corresponding to each of the plurality of sentence-intention pairs ⟋ S605 generating first prompt information based on the at least one first sentence- intention pair ⟋ S606 obtaining a target intention to which the input sentence belongs by performing an intention recognition on the input sentence based on the first prompt information ⟋ S607

FIG. 6

INTENTION RECOGNITION METHOD, ELECTRONIC DEVICE, AND STORAGE MEDIUM

CROSS-REFERENCE TO RELATED APPLICATION

This application claims priority to and benefits of Chinese Patent Application Serial No. 202311696384.0, filed with the State Intellectual Property Office of P. R. China on Dec. 11, 2023, the entire content of which is incorporated herein by reference.

FIELD

The present disclosure relates to a field of Artificial Intelligence (AI), and more particularly to an intention recognition method, an electronic device, and a storage medium.

BACKGROUND

With a continuous development of an AI technology, a way of human-computer interaction is evolving from command-based to dialog-based. For a dialog-based human-computer interaction scenario (e.g., an intention recognition system, a recommender system, a public sentiment system, a retrieval system, a text categorization system, etc.), a user intention may be understood first, and then an answer that the user wants can be given based on the user intention. Therefore, how to recognize the user intention is very important for the dialog-based human-computer interaction scenario.

SUMMARY

According to a first aspect of embodiments of the present disclosure, an intention recognition method is provided, and the intention recognition method includes:

obtaining an input sentence;

obtaining at least one first sentence-intention pair based on the input sentence, in which the first sentence-intention pair includes a candidate sentence similar to the input sentence and a candidate intention to which the candidate sentence belongs;

generating first prompt information based on the at least one first sentence-intention pair; and obtaining a target intention to which the input sentence belongs by performing an intention recognition on the input sentence based on the first prompt information.

According to a second aspect of embodiments of the present disclosure, the electronic device is provided, and the electronic device includes:

at least one processor; and a memory communicating with the at least one processor; in which, the memory stores an instruction executable by the at least one processor, and the instruction is executed by the at least one processor to enable the at least one processor to execute the intention recognition method provided by the first aspect of the present disclosure.

According to a third aspect of embodiments of the present disclosure, a non-transitory computer-readable storage medium storing a computer instruction is provided, and the computer instruction is configured to enable a computer to execute the intention recognition method provided by the first aspect of the present disclosure.

It should be understood that the content described in this section is not intended to identify key or important features of embodiments of the present disclosure, nor is it intended to limit a scope of the present disclosure. Other features of the present disclosure will become easy to understand through the following specification.

BRIEF DESCRIPTION OF THE DRAWINGS

The accompany drawings are configured to better understand the solution and do not constitute a limitation on this disclosure.

FIG. 1 is a flow chart of an intention recognition method based on a large model provided by an embodiment of the present disclosure.

FIG. 2 is a flow chart of an intention recognition method based on a large model provided by an embodiment of the present disclosure.

FIG. 3 is a flow chart of an intention recognition method based on a large model provided by an embodiment of the present disclosure.

FIG. 4 is a flow chart of an intention recognition method based on a large model provided by an embodiment of the present disclosure.

FIG. 5 is a flow chart of an intention recognition method based on a large model provided by an embodiment of the present disclosure.

FIG. 6 is a flow chart of an intention recognition method based on a large model provided by an embodiment of the present disclosure.

DETAILED DESCRIPTION

Figure 7:
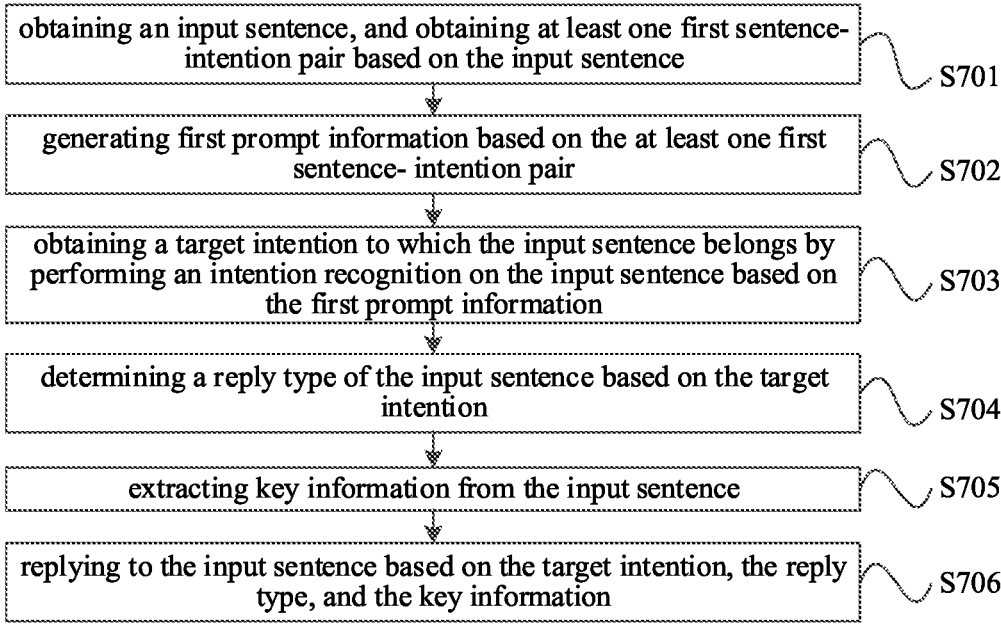
FIG. 7 is a flow chart of an intention recognition method based on a large model provided by an embodiment of the present disclosure.

Exemplary embodiments of the present disclosure are described below in conjunction with the drawings, including various details of embodiments of the present disclosure to aid in understanding, which should be considered merely exemplary. Therefore, those skilled in the art should recognize that various changes and modifications can be made to the embodiments described herein without departing from a scope and a spirit of the disclosure. Similarly, descriptions of well-known functions and structures have been omitted in the following description for the sake of clarity and conciseness.

Currently, a classifier in a deep learning technology or a machine learning technology can be used to predict a user intention. However, the way of using the classifier to predict the user intention has at least the following disadvantages:

(1) poor classification effect;

(2) requiring to retrain the classifier or a model in a case of adding an intention type or an intention category; and (3) requiring a super-large scale training prediction to train a model.

Therefore, in response to at least one of the above existing problems, the disclosure proposes an intention recognition method based on a large model, an intention recognition device based on a large model, an electronic device, and a storage medium.

The following describes, with reference to the drawings, the intention recognition method based on a large model, the intention recognition device based on a large model, the electronic device, and the storage medium according to the embodiments of the present disclosure. Before describing the embodiments of the present disclosure, common technical terms are first introduced for case of understanding.

A large model refers to a machine learning model with large-scale parameters and a complex computational structure, and is typically constructed from a deep neural network, having billions or even hundreds of billions of parameters. The large model is designed to improve an expression ability and a prediction performance of the model, and to be able to handle more complex tasks and data. The large model has a wide range of application in various fields, including natural language processing, computer vision, speech recognition, and a recommendation system.

Large language models (LLMs) in the large model, which is a type of natural language processing model based on a deep learning, is mainly characterized by having a large scale of model parameters and a complex neural network structure, with a powerful language understanding capability, a context awareness capability, and a language generation capability, and can automatically learn a useful feature representation from input data to generate a relevant text.

FIG. 1 is a flow chart of an intention recognition method based on a large model provided by an embodiment of the present disclosure.

Embodiments of present disclosure are exemplified by a fact that the intention recognition method based on a large model is configured in an intention recognition device based on a large model, and the intention recognition device based on a large model can be applied in any electronic device to enable the electronic device to execute an intention recognition function.

The electronic device can be any device with a computing capability, such as a personal computer, a mobile terminal, a server, etc. The mobile terminal, for example, can be a hardware device with various operating systems, touch screens and/or display screens, such as a mobile phone, a tablet computer, a personal digital assistant, a wearable device, etc.

As shown in FIG. 1, the intention recognition method based on a large model can include the following steps:

Step S101, an input sentence is obtained.

In embodiments of the present disclosure, there are no limitation on a method of obtaining the input sentence. For example, the input sentence can be a sentence inputted by a user, or can be a sentence collected online, such as using a web crawling technology to collect the input sentence online, or can be text data obtained from an existing training set or test set, and so on. Embodiments of the present disclosure are not limited thereto.

There are no limitation on an input manner of the input sentence. For example, the input manner can include, but is not limited to: a touch input (such as sliding, clicking, etc.), a keyboard input, a voice input, etc.

Step 102, at least one first sentence-intention pair is obtained based on the input sentence, in which the first sentence-intention pair includes a candidate sentence similar to the input sentence and a candidate intention to which the candidate sentence belongs.

In embodiments of the present disclosure, at least one sentence-intention pair (referred to as the first sentence-intention pair in the disclosure) that is similar to the input sentence can be retrieved based on the input sentence. The first sentence-intention pair includes: the candidate sentence similar to the input sentence, and the candidate intention to which the candidate sentence belongs.

Step 103, a first prompt information is generated based on the at least one first sentence-intention pair.

In embodiments of the present disclosure, the first prompt information (Prompt) can be generated based on the at least one first sentence-intention pair similar to the input sentence.

Step 104, a target intention to which the input sentence belongs is obtained by performing, an intention recognition on the input sentence based on the first prompt information.

In embodiments of the present disclosure, the intention recognition can be performed on the input sentence based on the first prompt information to obtain the target intention to which the input sentence belongs. The target intention can be an intention category to which the input sentence belongs, or the target intention can be a specific intention to which the input sentence belongs.

In the disclosure, an intention category recognition can be performed on the input sentence based on the first prompt information to obtain the intention category to which the input sentence belongs. For example, the intention category can include a recommendation, a planning, a guide, etc. Or, a specific intention recognition can be performed on the input sentence based on the first prompt information to obtain the specific intention to which the input sentence belongs. For example, the specific intention can be: purchasing an airline ticket with a departure place of A and a destination of B.

According to the intention recognition method based on a large model of embodiments of the present disclosure, the at least one first sentence-intention pair is obtained base on the input sentence; in which, the first sentence-intention pair includes the candidate sentence similar to the input sentence and the candidate intention to which the candidate sentence belongs; the first prompt information is generated base on the at least one first sentence-intention pair; the intention recognition is performed on the input sentence based on the first prompt information to obtain the target intention to which the input sentence belongs. It can be understood that the intentions to which the similar sentences belong are similar, and the target intention to which the input sentence belongs is recognized based on the candidate sentence similar to the input sentence and the candidate intention to which the candidate sentence belongs, which can improve an accuracy and a reliability of the intention recognition.

It should be noted that collection, storage, use, processing, transmission, provision, and public of user personal information involved in the technical solution of the present disclosure are all carried out under a premise of the user's consent, in compliance with relevant laws and regulations, and do not violate public order and good customs.

In order to clearly illustrate the above embodiments, the disclosure also provides an intention recognition method based on a large model.

FIG. 2 is a flow chart of an intention recognition method based on a large model provided by an embodiment of the present disclosure.

As shown in FIG. 2, the intention recognition method based on a large model can include the following steps:

Step S201, an input sentence is obtained.

Step S202, at least one first sentence-intention pair is obtained based on the input sentence, in which the first sentence-intention pair includes a candidate sentence similar to the input sentence and a candidate intention to which the candidate sentence belongs.

Explanation and description of steps S201 to S202 can be found in the relevant description of any embodiment of the present disclosure, and will not be repeated here.

Step S203, at least one question-answer pair is generated based on the at least one first sentence-intention pair; in which, a question in the question-answer pair is configured to indicate the candidate sentence in the first sentence-intention pair, and an answer in the question-answer pair is configured to indicate the candidate intention in the first sentence-intention pair.

In embodiments of the present disclosure, a corresponding question-answer pair can be generated based on each first sentence-intention pair. A question (referred to as Q) in each question-answer pair is configured to indicate a candidate sentence in the corresponding first sentence-intention pair, and an answer (referred to as A) in each question-answer pair is configured to indicate a candidate intention in the corresponding first sentence-intention pair.

For example, there are four first sentence-intention pairs similar to the input sentence, which are ["I want to cat near scenic area A, but I don't know what to cat" (candidate sentence 1), "recommendation" (candidate intention 1)], ["The nearest route to B" (candidate sentence 2), "planning" (candidate intention 2)], ["I will go to C tomorrow, what are some fun places to go" (candidate sentence 3), "guide" (candidate intention 3)], and ["Help me to write a hidden poem" (candidate sentence 4), "unknown" (candidate intention 4)]. The number of generated question-answer pairs is also four, which are: a question-answer pair 1: {Q: I want to cat near scenic area A, but I don't know what to cat. A: recommendation}, a question-answer pair 2: {Q: The nearest route to B}. A: planning}, a question-answer pair 3: {Q: I will go to C tomorrow, what are some fun places to go? A: guide}, and a question-answer pair 4: {Q: Help me to write a hidden poem. A: unknown}.

Step S204, an intention recognition range is determined based on at least one candidate intention in at least one first sentence-intention pair.

In embodiments of the present disclosure, the intention recognition range can be determined based on the candidate intention in each first sentence-intention pair. That is, the intention recognition range includes each candidate intention.

Referring to the above example, the intention recognition range can be: {recommendation, planning, guide, unknown}.

Step S205, a first prompt information is generated based on the at least one question-answer pair and the intention recognition range.

In embodiments of the present disclosure, the first prompt information can be generated based on the at least one question-answer pair and the intention recognition range. That is, the first prompt information can include each question-answer pair and the intention recognition range.

Step S206, a target intention to which the input sentence belongs is obtained by performing an intention recognition on the input sentence based on the first prompt information.

Explanation and description of step S206 can be found in the relevant description of any embodiment of the present disclosure, and will not be repeated here.

In any of the embodiments of the present disclosure, a method for recognizing the target intention can include, for example, determining the target intention to which the input sentence belongs from the at least one candidate intention indicated by the intention recognition range by performing the intention recognition on the input intention based on the first prompt information.

Referring to the above example, when recognizing the intention category to which the input sentence belongs, for example, the input sentence is "Where is the best place to have lunch for a couple gathering?", and the intention recognition range is {recommendation, planning, guide, unknown}, then the target intention can be "recommendation".

In summary, the intention recognition can be performed only within the intention recognition range indicated by the first prompt information, without the need for performing the intention recognition for all intentions, which can eliminate an intention recognition illusion, thus improving the accuracy and the reliability of an intention recognition result.

According to the intention recognition method based on a large model of embodiments of the present disclosure, the first prompt information can indicate the at least one question-answer pair, and the at least one question-answer pair can act as prior information or task information to indicate information to be extracted or recognized, which can improve the accuracy of intention recognition. In addition, the first prompt information can also indicate the intention recognition range, so that the intention recognition can be performed only within the intention recognition range indicated by the first prompt information, without the need for performing the intention recognition in all intentions, which can eliminate the intention recognition illusion, thus improving the accuracy and the reliability of the intention recognition result.

In order to clearly illustrate how the first prompt information is generated based on the at least one first sentence-intention pair in the above embodiments, the disclosure also provides an intention recognition method based on a large model.

FIG. 3 is a flow chart of an intention recognition method based on a large model provided by n embodiment of the present disclosure.

As shown in FIG. 3, the intention recognition method based on a large model can include the following steps:

Step S301, an input sentence is obtained.

Step S302, at least one first sentence-intention pair is obtained based on the input sentence, in which the first sentence-intention pair includes a candidate sentence similar to the input sentence and a candidate intention to which the candidate sentence belongs.

Step S303, at least one question-answer pair is generated based on the at least one first sentence-intention pair; in which, a question in the question-answer pair is configured to indicate the candidate sentence in the first sentence-intention pair, and an answer in the question-answer pair is configured to indicate the candidate sentence in the first sentence-intention pair.

Step S304, an intention recognition range is determined based on at least one candidate intention in at least one first sentence-intention pair.

Explanation and description of steps S301 to S304 can be found in the relevant description of any embodiment of the present disclosure, and will not be repeated here.

Step S305, first task information to be recognized by a large language model is generated based on the at least one question-answer pair.

In embodiments of the present disclosure, task information (referred to as the first task information in this disclosure) to be recognized by the large language model can be generated based on the at least one question-answer pair.

Referring the above example, the number of question-answer pairs is four, which are a question-answer pair 1: {Q: I want to eat near scenic area A, but I don't know what to eat. A: recommendation}, a question-answer pair 2: {Q: The nearest route to B}. A: planning}, a question-answer pair 3: {Q: I will go to C tomorrow, what are some fun places to go? A: guide}, and a question-answer pair 4: {Q: Help me to write a hidden poem. A: unknown},, and the first task information can be:

{Analyzing the user intention based on the following question-answer

Known question-answer:

Q: I want to eat near scenic area A, but I don't know what to eat.

A: Recommendation

Q: The nearest route to B

A: Planning

Q: I will go to C tomorrow, what are some fun places to go?

A: Guide

Q: Help me to write a hidden poem

A: Unknown}

Step S306, the first prompt information is generated based on the first task information and the intention recognition range.

In embodiments of the present disclosure, the first prompt information can be generated based on the first task information and the intention recognition range, i.e. the first prompt information can include both the first task information and the intention recognition range.

Referring the above example, the first prompt information can be:

{Analyzing the user intention based on the following question-answer pair, you can only return [Recommendation], [Planning], [Guide], or [Unknown]

Known question-answer:

Q: I want to eat near scenic area A, but I don't know what to eat.

A: Recommendation

Q: The nearest route to B

A: Planning

Q: I will go to C tomorrow, what are some fun places to go?

A: Guide

Q: Help me to write a hidden poem

A: Unknown}

Step S307, a target intention to which the input sentence belongs is obtained by performing an intention recognition on the input sentence based on the first prompt information.

Explanation and description of step S307 can be found in the relevant description of any embodiment of the present disclosure, and will not be repeated here.

In any of the embodiments of the present disclosure, a method for recognizing the target intention can include, for example, inputting the first prompt information and the input sentence into the large language model performing the intention recognition on the input sentence based on the first task information using the large language mode, and determining the target intention to which the input sentence belongs from the intention recognition range.

Thus, the target intention to which the input sentence belongs can be recognized based on the deep learning technology, which can improve the accuracy of the recognition result. In addition, both the first prompt information and the input sentence are used as inputs of the large language model, which can improve a prediction performance of the large language model. That is, the first prompt information can be used as the prior information or the task information to indicate what kind of information the large language model needs to extract or recognize, which can enhance an expression ability of the large language model.

According to the intention recognition method based on a large model of the embodiments of the present disclosure, the first prompt information can indicate the task information of the large language model, and the task information can be used as the prior information to indicate the information to be extracted or recognized by the large language model, which can improve a prediction accuracy of the large language model, i.e., enhance the accuracy of the intention recognition. In addition, the first prompt information can also indicate the intention recognition range, so that the intention recognition can be performed only within the intention recognition range indicated by the first prompt information, without the need for performing the intention recognition for all intentions, which can eliminate the intention recognition illusion, thus improving the reliability of the intention recognition result.

In order to clearly illustrate how the first sentence-intention pair similar to the input sentence is obtained in any embodiment of the present disclosure, the disclosure also provides an intention recognition method based on a large model.

FIG. 4 is a flow chart of an intention recognition method based on a large model provided by an embodiment of the present disclosure.

As shown in FIG. 4, the intention recognition method based on a large model can include the following steps:

Step S401, an input sentence is obtained.

Explanation and description of step S401 can be found in the relevant description of any embodiment of the present disclosure, and will not be repeated here.

Step S402, a target field to which the input sentence belongs is recognized.

The target field includes but are not limited to the following fields: healthcare, e-commerce, science and technology, business, law, social media, film and television script, advertising, music, history, etc.

For example, a semantic and syntactic analysis can be performed on the input sentence to obtain the target field to which the input sentence belongs.

For example, sentences in different fields have different language features, such as a professional term, an expression manner, a sentence structure, etc. Thus, in the disclosure, the target field to which the input sentence belongs may be recognized by analyzing the professional term, a keyword, and the sentence structure, etc., in the input sentence.

For example, the target field to which the input sentence belongs can be recognized based on a natural language processing (NLP) technology and a text classification algorithm.

It should be noted that the above method for recognizing the target field is only illustrative, but the disclosure is not limited to this. In practical applications, other algorithms can also be used to identify the target field to which the input sentence belongs.

Step S403, a target storage node that matches the target field is determined from at least one storage node.

Different storage nodes can be configured to store sentence-intention pairs under different fields.

In embodiments of the present disclosure, the target storage node that matches the target field can be determined from the at least one storage node. That is, the target storage node is configured to store the sentence-intention pair under the target field.

In any of the embodiments of the present disclosure, the plurality of sentence-intention pairs in the target storage node can be generated using the following steps.

1. A plurality of first sentences under the target field are collected from at least one data source.

2. First intentions to which the plurality of first sentences respectively belong are obtained.

A text classification algorithm can be used to recognize a first intention to which a first sentence belongs, or a manual labeling manner can be used to label the first intention to which the first sentence belongs. The embodiments of the present disclosure do not limit this.

3. The plurality of sentence-intention pairs are generated based on the plurality of first sentences and corresponding first intentions. That is, each sentence-intention pair includes one first sentence and a first intention to which the first sentence belongs.

In summary, the first sentences under the target field can be collected from respective data sources, the plurality of sentence-intention pairs under the target field are generated based on the first sentences and corresponding first intentions, and the plurality of sentence-intention pairs are stored in the target storage node, which can enhance richness and diversity of the sentence-intention pairs in the target storage node.

After any of the embodiments of the present disclosure, the plurality of sentence-intention pairs in the target storage node can be generated using the following steps.

1. A second sentence under the target field and a second intention to which the second sentence belongs are obtained.

The number of second sentences can be at least one.

For example, the second sentence under the target field can be collected from at least one data source, and the second intention of the second sentence can be obtained. For example, a text classification algorithm can be used to recognize the second intention to which the second sentence belongs, or a manual labeling manner can be used to label the second intention to which the second sentence belongs. The embodiments of the present disclosure do not limit this.

2. Second prompt information is obtained; in which, the second prompt information is configured to indicate second task information to be recognized by a large language model.

The second task information is configured to indicate to expand the input sentence.

For example, the second prompt information can be "Make a change to the sentence so that a new sentence has the same meaning as the original sentence".

3. A third sentence semantically similar to the second sentence is obtained by expanding the second sentence based on the second prompt information using the large language model.

In embodiments of the present disclosure, the large language model can be used to expand the second sentence based on the second prompt information to obtain the third sentence that is semantically similar (or has the same meaning) to the second sentence.

For example, the second sentence is "I want to go to scenic area A, and don't know what interesting places there are", the third sentence may be "I want to go to scenic area A, but I don't know what interesting places there are".

In any of the embodiments of the present disclosure, the number of sentences output by the large language model can be specified. That is, a plurality of third sentences semantically similar to or having the same meaning as the second sentence can be output at once through the large language model.

For example, the second prompt information can be configured to indicate a number of sentences output by the large language model. For example, the number of sentences is marked as N, the second prompt information can be "Make a change to the sentence and output N new sentences with the same meaning as the original sentence". In the disclosure, the second prompt information and the second sentence can be input into the large language model to expand the second sentence based on the second prompt information using the large language model to obtain N third sentences output by the large language model. Each third sentence is similar in semantics or has the same meaning to the second sentence.

Therefore, the large language model can be used to batch expand the second sentence to obtain N third sentences semantically similar to the second sentence. These third sentences may have differences in expression, sentence structures, word selections, and other aspects, thereby enhancing the richness and the diversity of the third sentences, which can more comprehensively express the intention and meaning of the second sentence. Moreover, one sentence may have a plurality of ways of understanding or meanings, which may lead to a semantic ambiguity. By batch expanding the second sentence, the plurality of third sentences with the same meaning as the second sentence can be obtained, and these third sentences may be more clear and detailed, which helps to eliminate the semantic ambiguity and improve an accuracy of language expression.

4. A sentence-intention pair under the target field is generated based on the third sentence and the second intention, and stored in the target storage node. That is, the sentence-intention pair includes the third sentence and the second intention to which the third sentence belongs.

It should be noted that the sentence-intention pair under the target field can also be generated based on the second sentence and the second intention to which the second sentence belongs, and stored to the target storage node.

In summary, the sentence-intention pairs under the target field can be expanded using the large language model, which can enhance the richness of the sentence-intention pairs stored in the target storage node.

It should be noted that a method for generating the sentence-intention pairs stored in other storage nodes is similar to a method for generating the sentence-intention pairs stored in the target storage node, and will not be repeated here.

Step S404, the at least one first sentence-intention pair that matches the input sentence is retrieved from a plurality of sentence-intention pairs stored in the target storage node.

In embodiments of the present disclosure, the first sentence-intention pair that matches the input sentence can be retrieved from the plurality of sentence-intention pairs stored in the target storage node. The first sentence-intention pair includes the candidate sentence similar to the input sentence and the candidate intention to which the candidate sentence belongs.

For example, a similarity between the input sentence and each sentence-intention pair in the target storage node can be calculated separately. The similarity refers to a similarity between the input sentence and the sentence in the sentence-intention pair. Therefore, in the disclosure, the first sentence-intention pair can be determined from the plurality of sentence-intention pairs in the target storage node based on the similarity corresponding to each sentence-intention pair.

For example, the plurality of sentence-intention pairs can be sorted in a descending order of their corresponding similarity values, to obtain a sorted sequence, and a set number of sentence-intention pairs that are sorted in the top order can be selected from the sorted sequence as the first sentence-intention pairs.

For example, the sentence-intention pair with a similarity higher than a set threshold can be used as the first sentence-intention pair.

In any of the embodiments of the present disclosure, when a new intention is added under the target field, the target storage node can be updated based on the new intention.

For example, a method for updating the target storage node can include following.

1. In the case of detecting that a third intention is added under the target field, at least one fourth sentence belonging to the third intention can be obtained.

The number of third intentions can be one or multiple, and embodiments of the present disclosure does not limit this.

The fourth sentence can be manually provided by a relevant person, or collected from at least one data source. Or, a batch of fourth sentences can be obtained by expanding using the large language model. The embodiments of the present disclosure does not limit this.

2. At least one second sentence-intention pair is generated based on the third intention and at least one fourth sentence. That is, each second sentence-intention pair includes one fourth sentence and the third intention to which the fourth sentence belongs.

3. The at least one second sentence-intention pair are written into the target storage node.

Thus, in the case of an intention change, such as adding a new intention, the sentence-intention pair containing the new intention can be added into the storage node, without the need of retraining the model, which can reduce resource and time costs of training.

It should be noted that when adding the new intention in other fields, the update manner of storage nodes that match other fields is similar to that of the target storage node, and will not be repeated here.

In any of the embodiments of the present disclosure, when a intention to which a sentence belongs in a certain sentence-intention pair in the target storage node changes, the sentence-intention pair in the target storage node can be updated.

For example, a method for updating the target storage node can be as following.

1. An update instruction triggered by a relevant person is received. The update instruction carries first identification information of a third sentence-intention pair to be updated in the target storage node, and a fourth intention to be updated corresponding to the third sentence-intention pair.

The first identification information is configured to uniquely identify the third sentence-intention pair. For example, the first identification information can be an ID (Identity) of the third sentence-intention pair.

2. In response to the update instruction, an intention in the third sentence-intention pair in the target storage node is updated to the fourth intention.

Thus, the intention in the sentence-intention pair in the storage node can be updated timely in the case of an intention change, to improve an accuracy of user intention recognition.

In any of the embodiments of the present disclosure, the relevant person can dynamically delete a sentence-intention pair in the storage node to meet a practical application requirement.

For example, a method for deleting manner of the sentence-intention pair may be as following.

1. A deletion instruction triggered by the relevant person is received.

2. In response to the deletion instruction, a fourth sentence-intention pair that matches the second identification information in the at least one storage node is deleted based on second identification information in the deletion instruction. For example, the second identification information in the deletion instruction can be an ID of the fourth sentence-intention pair.

And/or, 3. In response to the deletion instruction, a fifth sentence-intention pair that matches the sentence to be deleted from the plurality of sentence-intention pairs in the at least one storage node is determining based on a sentence to be deleted in the deletion instruction, and the fifth sentence-intention pair is deleted.

A similarity between a sentence in the fifth sentence-intention pair and the sentence to be deleted in the deletion instruction is higher than a set first similarity threshold.

In embodiments of the present disclosure, the fifth sentence-intention pair that matches the sentence to be deleted in the at least one storage node can be deleted based on a fuzzy matching manner.

And/or, 4. In response to the deletion instruction, based on a fifth intention to be deleted in the deletion instruction, a sixth sentence-intention pair that matches the fifth intention is determined from the plurality of sentence-intention pairs in the at least one storage node is determined, and the sixth sentence-intention pair is deleted.

A similarity between an intention in the sixth sentence-intention pair and the fifth intention to be deleted in the deletion instruction is higher than a set second similarity threshold.

In embodiments of the present disclosure, the sixth sentence-intention pair that matches the fifth intention to be deleted in the at least one storage node can be deleted based on a fuzzy matching manner.

Thus, the sentence-intention pairs in the at least one storage node can be dynamically maintained according to the actual application requirement, improving accuracy of subsequent retrieval and intention analysis in the future.

Step S405, first prompt information is generated based on the at least one first sentence-intention pair.

Step S406, a target intention to which the input sentence belongs is obtained by performing an intention recognition on the input sentence based on the first prompt information.

Explanation and description of steps S405 to S406 can be found in the relevant description of any embodiment of the present disclosure, and will not be repeated here.

The intention recognition method based on a large model in embodiments of the present disclosure can realize intention recognition within a professional field to which the input sentence belongs, further improving the accuracy and the reliability of an intention recognition result.

In order to clearly illustrate the above embodiments, the disclosure also proposes an intention recognition method based on a large model.

FIG. 5 is a flow chart of an intention recognition method based on a large model provided by an embodiment of the present disclosure.

As shown in FIG. 5, the intention recognition method based on a large model can include the following steps.

Step S501, an input sentence is obtained, and a target field to which the input sentence belongs is recognized.

Step S502, a target storage node that matches the target field is determined from at least one storage node.

Explanation and description of steps S501 to S502 can be found in the relevant description of any embodiment of the present disclosure, and will not be repeated here.

In any of the embodiments of the present disclosure, the target storage node can store a plurality of sentence-intention pairs, and a first sentence vector of a sentence in each of the plurality of sentence-intention pairs.

For example, an [embedding (vectorization) service] can be called to perform a vectorized representation on the sentence in the sentence-intention pair to obtain the first sentence vector of the sentence.

For example, based on an attention mechanism, the sentence in the sentence-intention pair can be encoded to obtain the first sentence vector of the sentence.

For example, a word frequency, a word vector, an N-gram (N-gram model) and other features of the sentence in the sentence-intention pair can be used as the first sentence vector of the sentence.

For example, the first sentence vector of the sentence can be determined based on a word vector of each word in the sentence in the sentence-intention pair. For example, a mean value of the word vectors of respective words in the sentence can be used as the first sentence vector of the sentence.

Step S503, a second sentence vector of the input sentence is obtained by performing a vectorized representation on the input sentence.

In embodiments of the present disclosure, the vectorized representation can be performed on the input sentence to obtain the second sentence vector of the input sentence. A calculation manner of the second sentence vector is similar to that of the first sentence vector, and will not be repeated here.

Step S504, a first similarity between the first sentence vector of the sentence in each of the plurality of sentence-intention pairs and the second sentence vector is obtained.

In embodiments of the present disclosure, a similarity (referred to as the first similarity in the disclosure) between the second sentence vector and the first sentence vector of the sentence in each of the plurality of sentence-intention pairs in the target storage node can be calculated respectively based on a similarity calculation algorithm.

Step S505, at least one first sentence-intention pair is determined from the plurality of sentence-intention pairs based on the first similarity corresponding to each of the plurality of sentence-intention pairs.

The first sentence-intention pair includes a candidate sentence similar to the input sentence and a candidate intention to which the candidate sentence belongs.

In embodiments of the present disclosure, the first sentence-intention pair can be determined from the plurality of sentence-intention pairs based on the first similarity corresponding to each sentence-intention pair in the target storage node.

For example, the plurality of sentence-intention pairs can be sorted in a descending order of the corresponding first similarity values, to obtain a sorted sequence. A set number of sentence-intention pairs that are sorted in the top order can be selected from the sorted sequence as the first sentence-intention pairs.

For example, a sentence-intention pair with a first similarity higher than a set threshold can be considered as a first sentence-intention pair.

Step S506, first prompt information is generated based on the at least one first sentence-intention pair.

Step S507, a target intention to which the input sentence belongs is obtained by performing, an intention recognition on the input sentence based on the first prompt information.

Explanation and description of steps S506 to S507 can be found in the relevant description of any embodiment of the present disclosure, and will not be repeated here.

According to the intention recognition method based on a large model in embodiments of the present disclosure, the sentence vector of the sentence in each sentence-intention pair is stored in the storage node, there is no need to calculate the sentence vector of each sentence in real-time during an intention recognition stage, which can improve an efficiency of the intention recognition.

In order to clearly illustrate the above embodiments, the disclosure also proposes an intention recognition method based on a large model.

FIG. 6 is a flow chart of an intention recognition method based on a large model provided by an embodiment of the present disclosure.

As shown in FIG. 6, the intention recognition method based on a large model can include the following steps:

Step S601: an input sentence is obtained, and a target field to which the input sentence belongs is recognized.

Step S602: a target storage node that matches the target field is determined from the at least one storage node.

Explanation and description of steps S601 to S602 can be found in the relevant description of any embodiment of the present disclosure, and will not be repeated here.

In any of the embodiments of the present disclosure, the target storage node can store a plurality of sentence-intention pairs, and a first directed graph of a sentence in each of the plurality of sentence-intention pairs. Nodes in the first directed graph are configured to indicate words in a corresponding sentence, and a directed edge between the nodes is configured to indicate a semantic relationship between the words (such as a synonym relationship, an antonym relationship, context words, etc.).

Step S603, a second directed graph of the input sentence is obtained.

In embodiments of the present disclosure, the second directed graph of the input sentence can be obtained.

Step S604, a second similarity between the first directed graph of the sentence in each of the plurality of sentence-intention pairs and the second directed graph is obtained.

In embodiments of the present disclosure, a similarity (referred to as the second similarity in the disclosure) between the second directed graph and the first directed graph of the sentence in each sentence-intention pair in the target storage node can be calculated separately. The second similarity can be determined based on a similarity between nodes in the two directed graphs and a similarity between directed edges in the two directed graphs.

For example, a graph-based similarity calculation model can be used to calculate the second similarity. The graph-based similarity calculation model typically considers a word or a phrase in a text as a node in a graph, and uses structural information, node information, and edge information in the graph to calculate a similarity between words. Commonly used graph-based similarity calculation model includes a GCN (Graph Convolutional Network), a Graph-SAGE (Graph Sample Aggregate), etc.

Step S605, the at least one first sentence-intention pair is determined from the plurality of sentence-intention pairs based on the second similarity corresponding to each of the plurality of sentence-intention pairs.

The first sentence-intention pair includes a candidate sentence similar to the input sentence and a candidate intention to which the candidate sentences belongs.

In embodiments of the present disclosure, the first sentence-intention pair can be determined from the plurality of sentence-intention pairs based on the second similarity corresponding to each sentence-intention pair in the target storage node.

For example, the plurality of sentence-intention pairs can be sorted in a descending order of the corresponding second similarity values, to obtain a sorted sequence. A set number of sentence-intention pairs that are sorted in the top order can be selected from the sorted sequence as the first sentence-intention pairs.

For example, a sentence-intention pair with a second similarity higher than a set threshold can be used as the first sentence-intention pair.

Step S606, first prompt information is generated based on the at least one first sentence-intention pair.

Step S607, a target intention to which the input sentence belongs is obtained by performing an intention recognition on the input sentence based on the first prompt information.

Explanation and description of steps S606 to S607 can be found in the relevant description of any embodiment of the present disclosure, and will not be repeated here.

According to the intention recognition method based on a large model in the embodiments of the present disclosure, the directed graph of the sentence in each sentence-intention pair is stored in the storage node, there is no need to calculate the directed graph of each sentence in real-time during an intention recognition stage, which can improve the efficiency of the intention recognition.

In order to clearly illustrate the above embodiments, the disclosure also proposes an intention recognition method based on a large model.

FIG. 7 is a flow chart of an intention recognition method based on a large model provided by an embodiment of the present disclosure.

As shown in FIG. 7, the intention recognition method based on a large model can include the following steps.

Step S701, an input sentence is obtained, and at least one first sentence-intention pair is obtained based on the input sentence.

The first sentence-intention pair includes a candidate sentence similar to the input sentence and a candidate intention to which the candidate sentence belongs.

Step S702, first prompt information is generated based on the at least one first sentence-intention pair.

Step S703, a target intention to which the input sentence belongs is obtained by performing an intention recognition on the input sentence based on the first prompt information.

Explanation and description of steps S701 to S703 can be found in the relevant description of any embodiment of the present disclosure, and will not be repeated here.

Step S704, a reply type of the input sentence is determined based on the target intention.

In embodiments of the present disclosure, the reply type of the input sentence can be determined based on the target intention. For example, if the target intention is to query for information, the reply type can be to provide relevant information. If the target intention is to express emotion or an attitude, the reply type can be an emotional response or a suggestion.

Step S705, key information is extracted from the input sentence.

In embodiments of the present disclosure, the key information such as a keyword, a phrase, etc. can be extracted from the input sentence.

Step S706, reply to the input sentence based on the target intention, the reply type, and the key information.

In embodiments of the present disclosure, the input sentence can be replied to by combining the target intention, the reply type, and the key information.

For example, reply information for the input sentence can be generated based on the target intention, the reply type, and the key information by template matching, machine learning, and other technologies, and the reply information can be used to reply to the input sentence.

In summary, content of a reply can be made to be relevant to the user's input sentence, and can clearly convey the information that the user needs, thereby improving an accuracy and a satisfaction of the reply.

In any of the embodiments of the present disclosure, an ability of LLMs can be utilized to perform the intention recognition on the input sentence input by the user, including the following parts.

First part is a device/service included in an intention recognition system, including:

1.1. a large language model;

1.2. an ES (Elasticsearch, a type of search server) cluster, which includes a plurality of storage nodes, and different storage nodes are configured to store sentence vectors of sentences under different fields;

1.3. an embedding service for converting a string into the sentence vector;

1.4. a storage service for storing [sentence, intention] into the ES cluster;

1.5. a deleting service for deleting [sentence, intention] in the ES cluster;

1.6. an update service for updating the [intention] corresponding to the [sentence] in the ES cluster;

1.7. a prompt word service for transforming an input sentence of a user into prompt information (or a prompt word) to be provided to the large language model; and 1.8. an inference service for converting the input sentence of the user into the [intention].

Figure 8:
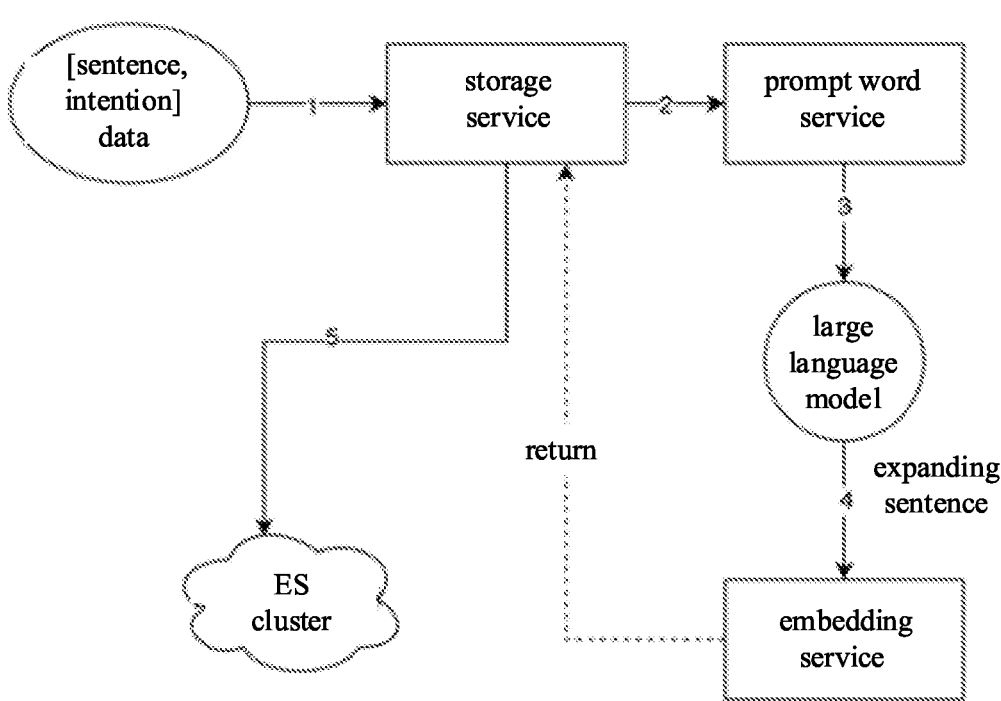
FIG. 8 is a schematic diagram of a data learning link provided by an embodiment of the present disclosure.

Second part is data learning, a principle of which can be shown in FIG. 8, and including the following steps:

2.1. preparing a series of original sentence-intention pairs containing [sentence] and corresponding [intention];

2.2. calling the [prompt word service] to generate the prompt information indicating to expand the input sentence;

2.3. calling a large language model, inputting the prompt information, expanding the [sentence], generating a similar sentence, and maintaining the same [intention];

2.4. calling the [embedding service] to convert the sentence into a sentence vector; and 2.5. storing the sentence, the sentence vector, and the intention into the ES cluster.

Three part is data deletion: deleting a sentence-intention pair in the ES cluster based on a specified ID, [intention] or [sentence].

Fourth part is data update: updating an intention in a sentence-intention pair based on a specified ID.

Figure 9:
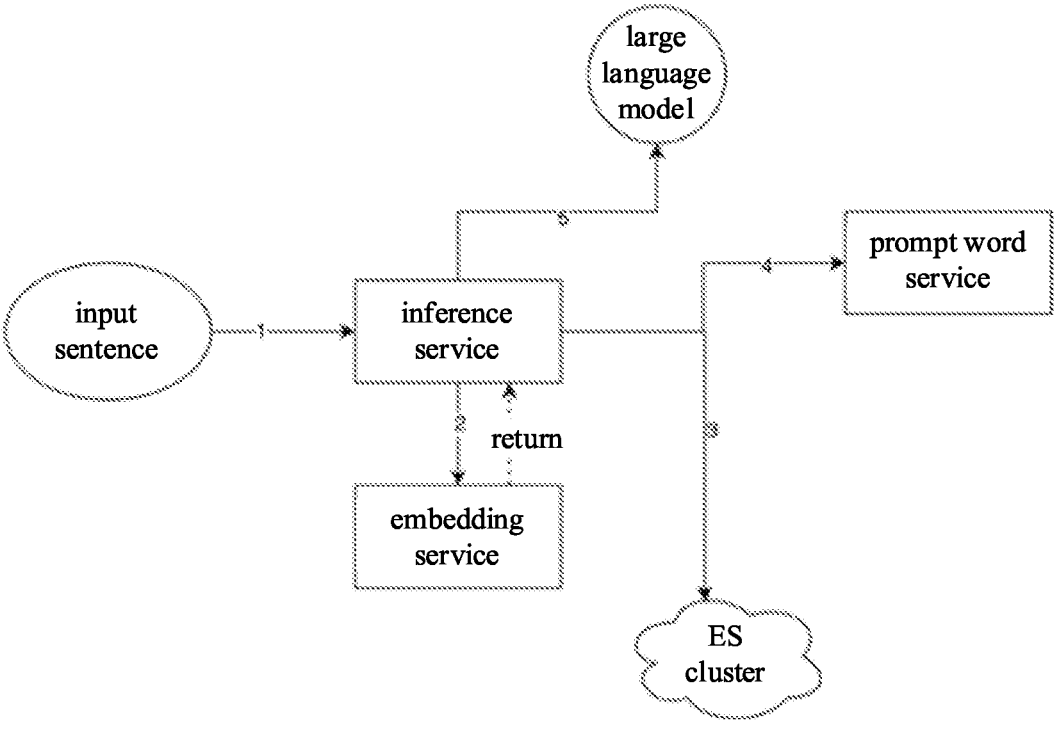
FIG. 9 is a schematic diagram of an intention recognition link provided by an embodiment of the present disclosure.

Fifth part is intention recognition, a principle of which can be shown in FIG. 9, including the following steps:

5.1. obtaining an input sentence of a user;

5.2. sending the input sentence of the user to the [embedding service] and converting the input sentence into a sentence vector;

5.3. using a vector retrieval API (Application Program Interface) to search for a set number (such as 10) of most similar [sentence, intention] in the ES cluster;

5.4. calling the [prompt word service] to generate corresponding prompt information based on the retrieved [sentence, intention]; and 5.5. calling the large language model, and inputting the prompt information and the input sentence, to use the large language model to perform intention recognition on the input sentence based on the prompt information, and obtain the [intention] to which the input sentence belongs.

In summary, the technical solution provided in the disclosure has at least the following advantages:

1. when the intention category changes, such as in the case of adding a new intention category, the sentence-intention pair containing the new intention can be added into the ES cluster, without the need of retraining the model, reducing the resources and time costs of training.

2. the intention recognition can be performed in a professional field to improve the accuracy of the intention recognition.

3. intention extraction can be performed within an intention recognition range indicated by the prompt information, which can eliminate the intention recognition illusion; and 4. there are fewer devices, and implementation and deployment are simple.

Corresponding to the intention recognition method based on a large model provided by the embodiments of FIG. 1 to FIG. 7, the disclosure also provides an intention recognition device based on a large model. As the intention recognition device based on a large model provided by the embodiments of the present disclosure corresponds to the intention recognition method based on a large model provided by the embodiments of FIG. 1 to FIG. 7, the implementation of the intention recognition method based on a large model is also applicable to the intention recognition device based on a large model provided by the embodiments of the present disclosure, and will not be described in detail in the disclosure.

Figure 10:
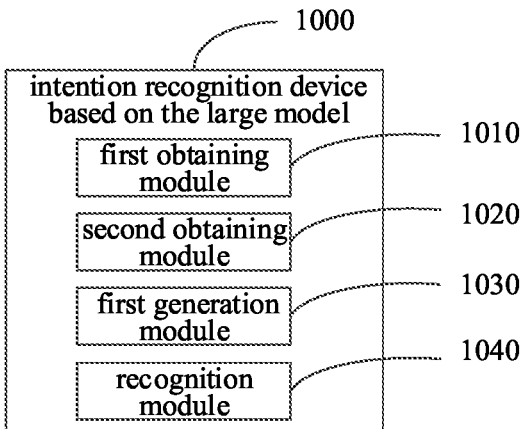
FIG. 10 is a schematic diagram of an intention recognition device based on a large model provided by an embodiment of the present disclosure.

FIG. 10 is a schematic diagram of an intention recognition device based on a large model provided by an embodiment of the present disclosure.

As shown in FIG. 10, the intention recognition device 1000 based on a large model can include: a first obtaining module 1010, a second obtaining module 1020, a first generation module 1030, and a recognition module 1040.

The first obtaining module 1010 is configured to obtain an input sentence.

The second obtaining module 1020 is configured to obtain at least one first sentence-intention pair based on the input sentence; in which, the first sentence-intention pair includes a candidate sentence similar to the input sentence and a candidate intentions to which the candidate sentence belongs.

The first generation module 1030 is configured to generate first prompt information based on the at least one first sentence-intention pair.

The recognition module 1040 is configured to obtain a target intention to which the input sentence belongs by performing an intention recognition on the input sentence based on the first prompt information.

In a possible implementation of the embodiments of the present disclosure, the first generation module 1030 is configured to: generate at least one question-answer pair based on the at least one first sentence-intention pair; in which, a question in the question-answer pair is configured to indicate the candidate sentence in the first sentence-intention pair, and an answer in the question-answer pair is configured to indicate the candidate sentence in the first sentence-intention pair; determine an intention recognition range based on at least one candidate intention in the at least one first sentence-intention pair; generate a first prompt information based on the at least one question-answer pair and the intention recognition range.

In a possible implementation of the embodiments of the present disclosure, the recognition module 1040 is configured to: determine the target intention to which the input sentence belongs from the at least one candidate intention indicated by the intention recognition range by performing an intention recognition on the input sentence based on the first prompt information.

In a possible implementation of the embodiments of the present disclosure, the first generation module 1030 is configured to: generate first task information to be recognized by a large language model based on the at least one question-answer pair; and generate the first prompt information based on the first task information and the intention recognition range.

In a possible implementation of the embodiments of the present disclosure, the recognition module 1040 is configured to: input the first prompt information and the input sentence into the large language model, perform the intention recognition on the input sentence based on the first task information using the large language model, and determine the target intention to which the input sentence belongs from the intention recognition range.

In a possible implementation of the embodiments of the present disclosure, the second obtaining module 1020 is configured to: recognize a target field to which the input sentence belongs; determine a target storage node that matches the target field from at least one storage node; and retrieve, from a plurality of sentence-intention pairs stored in the target storage node, the at least one first sentence-intention pair that matches the input sentence.

In a possible implementation of the embodiments of the present disclosure, the target storage node also stores: a first sentence vector of a sentence in each of the plurality of sentence-intention pairs, and the second obtaining module 1020 is configured to: obtain a second sentence vector of the input sentence by performing a vectorized representation on the input sentence; obtain a first similarity between the second sentence vector and the first sentence vector of the sentence in each of the plurality of sentence-intention pairs;

and determine, based on the first similarity corresponding to each of the plurality of sentence-intention pairs, the at least one first sentence-intention pair from the plurality of sentence-intention pairs.

In a possible implementation of the embodiments of the present disclosure, the target storage node also stores: a first directed graph of a sentence in each of the plurality of sentence-intention pairs, in which nodes in the first directed graph are configured to indicate words in a corresponding sentence, and a directed edge between the nodes is used to indicate a semantic relationship between the words. The second obtaining module 1020 is configured to: obtain a second directed graph of the input sentence; obtain a second similarity between the second directed graph and the first directed graph of the sentence in each of the plurality of sentence-intention pairs; and determine, based on the second similarity of each of the plurality of sentence-intention pairs, the at least one first sentence-intention pair from the plurality of sentence-intention pairs.

In a possible implementation of the embodiments of the present disclosure, the plurality of sentence-intention pairs in the target storage node are generated using the following modules:

a collection module for collecting a plurality of first sentences under the target field from at least one data source;

a third obtaining module for obtaining first intentions to which the plurality of first sentences belong; and a second generation module for generate a plurality of sentence-intention pairs based on the plurality of first sentences and corresponding first intentions.

In a possible implementation of the embodiments of the present disclosure, the plurality of sentence-intention pairs in the target storage node are generated using the following modules:

a fourth obtaining module for obtaining a second sentence under the target field and a second intention to which the second sentence belongs;

a fifth obtaining module for obtaining second prompt information; in which, the second prompt information is configured to indicate second task information to be recognized by the large language model;

an expansion module for obtaining a third sentence semantically similar to the second sentence by expanding the second sentence based on the second prompt information using the large language model; and a third generation module for generating a sentence-intention pair based on the third sentence and the second intention.

In a possible implementation of the embodiments of the present disclosure, the second prompt information is configured to indicate a number N of sentences output by the large language model; the expansion module is configured to: input the second prompt information and the second sentence into the large language model, and obtain the N third sentences output by the large language model by expanding the second sentence based on the second prompt information using the large language model; in which, the third sentence is semantically similar to the second sentence.

In a possible implementation of the embodiments of the present disclosure, the intention recognition device 1000 based on a large model can further include:

a sixth obtaining module for obtaining, in response to detecting that a third intention is added under the target field, obtain at least one fourth sentence belonging to the third intention;

a fourth generation module for generating at least one second sentence-intention pair based on the third intention and at least one fourth sentence; and a write module for writing the at least one second sentence-intention pair into the target storage node.

In a possible implementation of the embodiments of the present disclosure, the intention recognition device 1000 based on a large model can further include:

a first receiving module for receiving an update instruction; in which, the update instruction carries first identification information of a third sentence-intention pair in the target storage node and a fourth intention to be updated corresponding to the third sentence-intention pair; and an update module for updating, in response to the update instruction, an intention in the third sentence-intention pair in the target storage node to the fourth intention.

In a possible implementation of the embodiments of the present disclosure, the intention recognition device 1000 based on a large model can further include:

a second receiving module for receiving a deletion instruction; and a deletion module for, in response to the deletion instruction, deleting, based on second identification information in the deletion instruction, a fourth sentence-intention pair that matches the second identification information in the at least one storage node; and/or, in response to the deletion instruction, determining, based on a sentence to be deleted in the deletion instruction, a fifth sentence-intention pair that matches the sentence to be deleted from the plurality of sentence-intention pairs in the at least one storage node, and deleting the fifth sentence-intention pair; and/or, in response to the delete instruction, determining, based on a fifth intention to be deleted in the deletion instruction, a sixth sentence-intention pair that matches the fifth intention from the plurality of sentence-intention pairs in the at least one storage node, and deleting the sixth sentence-intention pair.

In a possible implementation of the embodiments of the present disclosure, the intention recognition device 1000 based on a large model can further include:

a determining module for determining a reply type of the input sentence based on the target intention;

an extraction module for extracting key information from the input sentence; and a reply module for replying to the input sentence based on the target intention, the reply type, and the key information.

According to the intention recognition device based on a large model in embodiments of the present disclosure, the at least one first sentence-intention pair is obtained base on the input sentence; in which, the first sentence-intention pair includes the candidate sentence similar to the input sentence and the candidate intention to which the candidate sentence belongs; the first prompt information is generated base on the at least one first sentence-intention pair; the intention recognition is performed on the input sentence based on the first prompt information to obtain the target intention to which the input sentence belongs. It can be understood that the intentions to which the similar sentences belongs are similar, and the target intention to which the input sentence belongs is recognized based on the candidate sentence similar to the input sentence and the candidate intention to which the candidate sentence belongs, which can improve the accuracy and the reliability of the intention recognition.

In order to implement the above embodiments, the present disclosure also provides an electronic device, and the electronic device can include at least one processor; and a memory communicating with the at least one processor. The memory stores an instruction executable by at least one processor, and the instruction is executed by at least one processor to enable at least one processor to execute the intention recognition method based on a large model provided by any of the above embodiments of the present disclosure.

In order to implement the above embodiments, the present disclosure also provides a non-transitory computer-readable storage medium storing a computer instruction, in which the computer instruction is configured to enable a computer to execute the intention recognition method based on a large model provided by any of the above embodiments of the present disclosure.

In order to implement the above embodiments, the present disclosure also provides a computer program product including a computer program that, when executed by a processor, the intention recognition method based on the large model provided by any of the above embodiments of the present disclosure is performed.

According to the disclosed embodiments, the present disclosure also provides an electronic device, a readable storage medium, and a computer program product.

Figure 11:
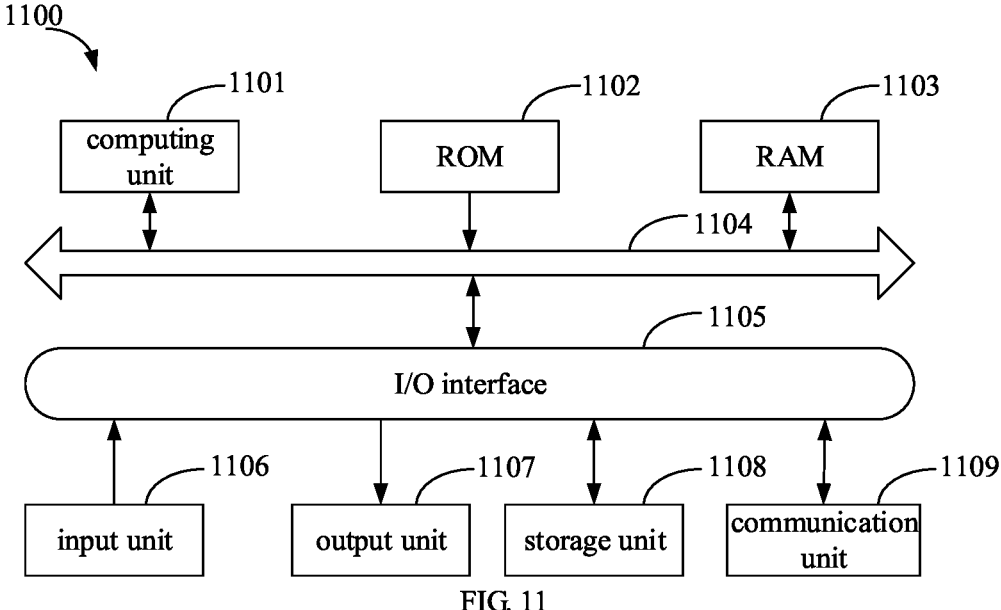
FIG. 11 is a schematic block diagram of an electronic device that is capable to implement the embodiments of the present disclosure.

FIG. 11 shows a schematic block diagram of an electronic device that is capable to implement the embodiments of the present disclosure. The electronic device can include a server and a client in the above embodiments. The electronic device is intended to represent various forms of digital computers, such as a laptop, a desktop computer, a workbench, a personal digital assistant, a server, a blade server, a mainframe computer, and other suitable computers. The electronic device can also represent various forms of mobile devices, such as a personal digital processing, a cellular phone, a smartphone, a wearable device, and other similar computing devices. Components, their connections and relationships, and their functions shown herein are only examples and are not intended to limit the implementation of the present disclosure described and/or required in this disclosure.

As shown in FIG. 11, a device 1100 includes a computing unit 1101 that can perform various appropriate actions and processes based on a computer program stored in a ROM (Read-Only Memory) 1102 or a computer program loaded from a storage unit 1108 to a RAM (Random Access Memory) 1103. In the RAM 1103, various programs and data required for an operation of the device 1100 can also be stored. The computing unit 1101, the ROM 1102, and the RAM 1103 are connected to each other through a bus 1104. An I/O (Input/Output) interface 1105 is also connected to the bus 1104.

A plurality of components in the device 1100 are connected to the I/O interface 1105, including: an input unit 1106, such as a keyboard, a mouse, etc.; an output unit 1107, such as various types of displays, speakers, etc.; a storage unit 1108, such as a disk, a CD, etc.; and a communication unit 1109, such as a network card, a modem, a wireless communication transceiver, etc. The communication unit 1109 allows the device 1100 to exchange information/data with other apparatuses through a computer network such as an Internet and/or various telecommunications networks.

The computing unit 1101 can be various general-purpose and/or specialized processing components with processing and computing capabilities. Some examples of the computing unit 1101 include but are not limited to a CPU (Central Processing Unit), a GPU (Graphic Processing Units), various specialized AI (Artificial Intelligence) computing chips, various computing units that run machine learning model algorithms, a DSP (Digital Signal Processor), and any suitable processor, controller, microcontroller, etc. The computing unit 1101 executes various methods and processes described above, such as the intention recognition method based on a large model mentioned in the above embodiments. For example, in some embodiments, the above intention recognition method based on a large model can be implemented as a computer software program tangibly contained in a machine-readable medium, such as the storage unit 1108. In some embodiments, some or all of the computer program can be loaded and/or installed onto the device 1100 via the ROM 1102 and/or the communication unit 1109. When the computer program is loaded into the RAM 1103 and executed by the computing unit 1101, one or more steps of the intention recognition method based on a large model described above can be executed. Alternatively, in other embodiments, the computing unit 1101 can be configured in any other suitable manner (e.g., with an aid of firmware) to execute the intention recognition method based on a large model described above.

The various implementations of the systems and technologies described above in this disclosure can be implemented in a digital electronic circuit system, an integrated circuit system, a FPGA (Field Programmable Gate Array), an ASIC (Application Specific Integrated Circuit), an ASSP (Application Specific Standard Product), a SOC (System On Chip), a CPLD (Complex Programmable Logic Device), computer hardware, firmware, software, and/or combinations thereof. These various implementation methods can include: implementing in one or more computer programs, the one or more computer programs being executable and/or interpretable on a programmable system including at least one programmable processor, in which the programmable processor can be a dedicated or general-purpose programmable processor, capable of receiving data and instructions from a storage system, at least one input device, and at least one output device, and transmitting the data and instructions to the storage system, the at least one input device, and the at least one output device.

Program codes used to implement the method of the present disclosure can be written in any combination of one or more programming languages. These program codes can be provided to the processor or the controller of a general-purpose computer, a specialized computer, or other programmable data processing devices, so that when the program codes are executed by the processor or controller, functions/operations specified in a flowchart and/or block diagram are implemented. The program codes can be executed entirely on a machine, partially on a machine, partially on a machine as a standalone software package and partially on a remote machine, or entirely on a remote machine or server.

In the context of this disclosure, the machine-readable medium can be a tangible medium that contains or stores a program for used by or in combination with an instruction execution system, apparatus, or device. The machine-readable medium can be a machine-readable signal medium or a machine-readable storage medium. The machine-readable medium can include, but are not limited to, an electronic, magnetic, optical, electromagnetic, infrared, or semiconductor system, device, or apparatus, or any suitable combination of the above. More specific examples of the machine-readable storage medium include an electrical connection based on one or more wires, a portable computer disk, a hard disk, a RAM, a ROM, an EPROM (Electrically Programmable Read-Only-Memory) or a flash memory, a fiber optic, a CD-ROM (Compact Disc Read-Only Memory), an optical storage apparatus, a magnetic storage apparatus, or any suitable combination of the above.

In order to provide an interaction with the user, the system and technology described herein can be implemented on a computer equipped with a display device (e.g. CRT (Cathode-Ray Tube) or LCD (Liquid Crystal Display) monitor) for displaying information to the user; and a keyboard and a pointing device (such as a mouse or a trackball), through which the user can provide the input to the computer. Other types of devices can also be used to provide the interaction with the user. For example, a feedback provided to the user can be any form of sensory feedback (such as a visual feedback, an auditory feedback, or a tactile feedback); and the input from the user can be received in any form, including a sound input, a speech input, or a tactile input.

The systems and technologies described herein can be implemented in a computing system (such as a data server) that includes a backend component, or a computing system (such as an application server) that includes a middleware component, or a computing system (such as a user computer with a graphical user interface or a web browser, through which the user can interact with the implementation of the systems and technologies described herein) that includes a frontend component, or a computing system that includes any combination of such the backend component, the middleware component, or the frontend component. The components of the system can be interconnected through any form or medium of digital data communication, such as a communication network. Examples of the communication network include: a LAN (Local Area Network), a WAN (Wide Area Network), an Internet and a block-chain network.

A computer system can include a client and a server. The client and the server are generally far apart from each other and typically interact through the communication network. A relationship between the client and the server is generated by the computer programs that run on the corresponding computers and have a client-server relationship with each other. The server can be a cloud server, also known as a cloud computing server or a cloud host, which is a host product in a cloud computing service system to solve the problems of difficult management and weak business scalability in a traditional physical host and a VPS service (Virtual Private Server). The server can also be a distributed system server or a server that combines a block-chain.

It should be noted that an artificial intelligence is a study of making the computer simulate certain thought processes and intelligent behaviors of humans (such as learning, reasoning, thinking, planning, etc.), and there are both hardware and software technologies. An artificial intelligence hardware technology generally includes technologies such as a sensor, a dedicated artificial intelligence chip, cloud computing, distributed storage, big data processing, etc. An artificial intelligence software technology mainly includes a computer vision technology, a speech recognition technology, a natural language processing technology, as well as machine learning/deep learning, a big data processing technology, a knowledge graph technology and other major directions.

According to the technical solution of the embodiments of the present disclosure, the at least one first sentence-intention pair is obtained based on the input sentence; in which, the first sentence-intention pair includes the candidate sentence similar to the input sentence and the candidate intention to which the candidate sentence belong; the first prompt information is generated base on the at least one first sentence-intention pair; the intention recognition is performed on the input sentence based on the first prompt information to obtain the target intention to which the input sentence belongs. It can be understood that the intentions to which the similar sentences belong are similar, and the target intention to which the input sentence belongs is recognized based on the candidate sentence similar to the input sentence and the candidate intention to which the candidate sentence belongs, which can improve the accuracy and the reliability of the intention recognition.

It should be understood that various forms of processes shown above can be used to reorder, add, or delete steps. For example, the steps described in this disclosure can be executed in parallel, sequentially, or in different orders, as long as they can achieve a desired result of the technical solution disclosed in the present disclosure. This disclosure does not limit it here.

The above specific implementations do not constitute limitations on a scope of protection of the present disclosure. Those skilled in the art should understand that various modifications, combinations, sub-combinations, and substitutions can be made based on a design requirement and other factors. Any modifications, equivalent substitutions, and improvements made within a spirit and a principle of the present disclosure shall be included within the scope of protection of the present disclosure.

What is claimed is:

1. An intention recognition method, comprising:
obtaining an input sentence;
obtaining at least one first sentence-intention pair based on the input sentence, wherein the first sentence-intention pair comprises a candidate sentence similar to the input sentence and a candidate intention to which the candidate sentence belongs;
generating first prompt information based on the at least one first sentence-intention pair, wherein generating the first prompt information based on the at least one first sentence-intention pair comprises:
generating at least one question-answer pair based on the at least one first sentence-intention pair; wherein a question in the question-answer pair is configured to indicate the candidate sentence in the first sentence-intention pair, and an answer in the question-answer pair is configured to indicate the candidate intention in the first sentence-intention pair;
determining an intention recognition range based on at least one candidate intention in the at least one first sentence-intention pair; and
generating the first prompt information based on the at least one question-answer pair and the intention recognition range; and
obtaining a target intention to which the input sentence belongs by performing an intention recognition on the input sentence based on the first prompt information.

2. The method according to claim 1, wherein obtaining the target intention to which the input sentence belongs by performing the intention recognition on the input sentence based on the first prompt information comprises:
determining the target intention to which the input sentence belongs from the at least one candidate intention indicated by the intention recognition range by performing the intention recognition on the input sentence based on the first prompt information.

3. The method according to claim 1, wherein generating the first prompt information based on the at least one question-answer pair and the intention recognition range comprises:

generating first task information to be recognized by a large language model based on the at least one question-answer pair; and generating the first prompt information based on the first task information and the intention recognition range.

4. The method according to claim 3, wherein obtaining the target intention to which the input sentence belongs by performing the intention recognition on the input sentence based on the first prompt information comprises:

inputting the first prompt information and the input sentence into the large language model, performing the intention recognition on the input sentence based on the first task information using the large language model, and determining the target intention to which the input sentence belongs from the intention recognition range.

5. The method according to claim 1, wherein obtaining the at least one first sentence-intention pair based on the input sentence comprises:

recognizing a target field to which the input sentence belongs;

determining a target storage node that matches the target field from at least one storage node; and retrieving, from a plurality of sentence-intention pairs stored in the target storage node, the at least one first sentence-intention pair that matches the input sentence.

6. The method according to claim 5, wherein the target storage node stores: a first sentence vector of a sentence in each of the plurality of sentence-intention pairs;

wherein retrieving, from the plurality of sentence-intention pairs stored in the target storage node, the at least one first sentence-intention pair that matches the input sentence comprises:

obtaining a second sentence vector of the input sentence by performing a vectorized representation on the input sentence;

obtaining a first similarity between the first sentence vector of the sentence in each of the plurality of sentence-intention pairs and the second sentence vector; and determining, based on the first similarity corresponding to each of the plurality of sentence-intention pairs, the at least one first sentence-intention pair from the plurality of sentence-intention pairs.

7. The method according to claim 5, wherein the target storage node stores: a first directed graph of a sentence in each of the plurality of sentence-intention pairs, wherein nodes in the first directed graph are configured to indicate words in a corresponding sentence, and a directed edge between the nodes is configured to indicate a semantic relationship between the words;

wherein retrieving, from the plurality of sentence-intention pairs stored in the target storage node, the at least one first sentence-intention pair that matches the input sentence comprises:

obtaining a second directed graph of the input sentence;

obtaining a second similarity between the first directed graph of the sentence in each of the plurality of sentence-intention pairs and the second directed graph; and determining, based on the second similarity corresponding to each of the plurality of sentence-intention pairs, the at least one first sentence-intention pair from the plurality of sentence-intention pairs.

8. The method according to claim 5, wherein the plurality of sentence-intention pairs in the target storage node are generated by:

collecting a plurality of first sentences under the target field from at least one data source;

obtaining first intentions to which the plurality of first sentences belong; and generating a plurality of sentence-intention pairs based on the plurality of first sentences and corresponding first intentions.

9. The method according to claim 5, wherein the plurality of sentence-intention pairs in the target storage node are generated by:

obtaining a second sentence under the target field and a second intention to which the second sentence belongs;

obtaining second prompt information; wherein the second prompt information is configured to indicate second task information to be recognized by a large language model;

obtaining a third sentence semantically similar to the second sentence by expanding the second sentence based on the second prompt information using the large language model; and generating a sentence-intention pair based on the third sentence and the second intention.

10. The method according to claim 9, wherein the second prompt information is configured to indicate a number N of sentences output by the large language model;

wherein obtaining the third sentence semantically similar to the second sentence by expanding the second sentence based on the second prompt information using the large language model comprises:

inputting the second prompt information and the second sentence into the large language model, and obtaining the N third sentences output by the large language model by expanding the second sentence based on the second prompt information using the large language model; wherein, the third sentence is similar in semantics to the second sentence.

11. The method according to claim 5, further comprising:

in response to detecting that a third intention is added under the target field, obtaining at least one fourth sentence belonging to the third intention;

generating at least one second sentence-intention pair based on the third intention and at least one fourth sentence; and writing the at least one second sentence-intention pair into the target storage node.

12. The method according to claim 5, further comprising:

receiving an update instruction; wherein, the update instruction carries first identification information of a third sentence-intention pair in the target storage node, and a fourth intention to be updated corresponding to the third sentence-intention pair; and in response to the update instruction, updating an intention in the third sentence-intention pair in the target storage node to the fourth intention.

13. The method according to claim 5, further comprising:

receiving a deletion instruction; and in response to the deletion instruction, performing at least one of:

deleting, based on second identification information in the deletion instruction, a fourth sentence-intention pair that matches the second identification information in the at least one storage node;

determining, based on a sentence to be deleted in the deletion instruction, a fifth sentence-intention pair that matches the sentence to be deleted from the plurality of sentence-intention pairs in the at least one storage node, and deleting the fifth sentence-intention pair;

or determining, based on a fifth intention to be deleted in the deletion instruction, a sixth sentence-intention pair that matches the fifth intention from the plurality of sentence-intention pairs in the at least one storage node, and deleting the sixth sentence-intention pair.

14. The method according to claim 1, wherein the method further comprises:

determining a reply type of the input sentence based on the target intention;

extracting key information from the input sentence; and replying to the input sentence based on the target intention, the reply type, and the key information.

15. An electronic device, comprising:

at least one processor; and a memory communicating with the at least one processor;

wherein the at least one processor is configured to:

obtain an input sentence;

obtain at least one first sentence-intention pair based on the input sentence, wherein the first sentence-intention pair comprises a candidate sentence similar to the input sentence and a candidate intention to which the candidate sentence belongs;

generate first prompt information based on the at least one first sentence-intention pair, wherein, when generating the first prompt information based on the at least one first sentence-intention pair, the at least one processor is configured to:

generate at least one question-answer pair based on the at least one first sentence-intention pair; wherein a question in the question-answer pair is configured to indicate the candidate sentence in the first sentence-intention pair, and an answer in the question-answer pair is configured to indicate the candidate intention in the first sentence-intention pair;

determine an intention recognition range based on at least one candidate intention in the at least one first sentence-intention pair; and generate the first prompt information based on the at least one question-answer pair and the intention recognition range; and obtain a target intention to which the input sentence belongs by performing an intention recognition on the input sentence based on the first prompt information.

16. The electronic device according to claim 15, wherein, when obtaining the target intention to which the input sentence belongs by performing the intention recognition on the input sentence based on the first prompt information, the at least one processor is configured to:

determine the target intention to which the input sentence belongs from the at least one candidate intention indicated by the intention recognition range by performing the intention recognition on the input sentence based on the first prompt information.

17. The electronic device according to claim 15, wherein, when generating the first prompt information based on the at least one question-answer pair and the intention recognition range, the at least one processor is configured to:

generate first task information to be recognized by a large language model based on the at least one question-answer pair; and generate the first prompt information based on the first task information and the intention recognition range.

18. A non-transitory computer-readable storage medium storing a computer instruction, wherein the computer instruction is configured to enable a computer to execute an intention recognition method, the method comprising:

obtaining an input sentence;

obtaining at least one first sentence-intention pair based on the input sentence, wherein the first sentence-intention pair comprises a candidate sentence similar to the input sentence and a candidate intention to which the candidate sentence belongs;

generating first prompt information based on the at least one first sentence-intention pair, wherein generating the first prompt information based on the at least one first sentence-intention pair comprises:

generating at least one question-answer pair based on the at least one first sentence-intention pair; wherein a question in the question-answer pair is configured to indicate the candidate sentence in the first sentence-intention pair, and an answer in the question-answer pair is configured to indicate the candidate intention in the first sentence-intention pair;

determining an intention recognition range based on at least one candidate intention in the at least one first sentence-intention pair; and generating the first prompt information based on the at least one question-answer pair and the intention recognition range; and obtaining a target intention to which the input sentence belongs by performing an intention recognition on the input sentence based on the first prompt information.

* * * * *